(12) United States Patent
Dahlheimer

(10) Patent No.: US 7,673,479 B2
(45) Date of Patent: Mar. 9, 2010

(54) SEAL SEAT RING COMPONENT WITH LOCKING AND VENTING FEATURES

(75) Inventor: John C. Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 904 days.

(21) Appl. No.: 11/457,990

(22) Filed: Jul. 17, 2006

(65) Prior Publication Data

US 2008/0047306 A1    Feb. 28, 2008

(51) Int. Cl.
*B08B 3/12* (2006.01)
*F16J 15/34* (2006.01)
*D06F 13/00* (2006.01)
*D06F 25/00* (2006.01)
*F16J 15/36* (2006.01)

(52) U.S. Cl. ............................. 68/5 E; 68/133; 68/140; 277/371; 277/392

(58) Field of Classification Search ....................... None
See application file for complete search history.

(56) References Cited

U.S. PATENT DOCUMENTS 3,024,028 A * 3/1962 Murphy ...................... 277/372
5,111,736 A    5/1992  Buchberger et al.
5,123,660 A    6/1992  Dahlheimer et al.
5,957,461 A    9/1999  Ulrich
6,098,986 A    8/2000  Nowak et al.
6,113,106 A    9/2000  Dahlheimer
6,517,077 B1   2/2003  Enomura et al.
6,592,365 B1 * 7/2003  Johns ........................ 432/244
6,802,780 B2  10/2004  Glowacki et al.
6,805,357 B2  10/2004  Dahlheimer
6,913,266 B2   7/2005  Jarchau et al.

* cited by examiner

*Primary Examiner*—Michael Barr
*Assistant Examiner*—Jason Y Ko
(74) *Attorney, Agent, or Firm*—Ronald W. Wangerow; Harness, Dickey & Pierce, P.L.C.

(57) ABSTRACT

A seal assembly includes a ring component for coupling a seat component to a shaft. The ring component includes a first portion having an annular shape and configured to have a sealed engagement with the shaft. The ring component also includes a second portion having a flange extending radially outwardly therefrom. The ring component is configured to receive the seat component between the flange and the first portion and thus form a seal seat assembly. The flange is configured to mechanically lock the seat component relative to the ring component when the seal seat assembly is disposed on the shaft.

20 Claims, 5 Drawing Sheets

SEAL SEAT RING COMPONENT WITH LOCKING AND VENTING FEATURES

FIELD

The present disclosure relates to seal assemblies, in particular to ring components for seal assemblies.

BACKGROUND

The statements in this section merely provide background information related to the present disclosure and may not constitute prior art.

Appliances and other apparatuses are known to employ a seal assembly between a rotatable shaft and a relatively stationary base. Such seal assemblies can include a seal seat or similar component coupled to the shaft by a drive ring or similar component. However, conventional seal seats and drive rings can become misaligned or disengaged during assembly onto and over shafts as they are typically only coupled by friction between the drive ring and the seal seat. Misalignment and disengagement of such components during assembly can lead to poor performance of a seal assembly and/or failure of a seal assembly. Accordingly, it would be desirable to lock such components of a seal assembly relative to one another during assembly.

SUMMARY

In one form, the present disclosure provides a seal seat assembly for a shaft of an appliance. The seal seat assembly can include an annular seat component and a ring component. The seat component can have an inner surface defining an inner diameter. The seat component can be configured to be disposed around the shaft of the appliance with a first clearance between the seat component inner diameter and the shaft. The ring component can include an annular first portion operable to have a sealed engagement with the shaft and a second portion extending axially from a first end surface of the first portion. The second portion can have a flange extending radially outwardly therefrom. The flange can have an outer diameter and a radial thickness. The ring component can be configured to receive the seat component between the flange and the first portion and couple the seat component to the shaft. The flange outer diameter can be larger than the seat component inner diameter, and the flange radial thickness can be configured to be larger than the first clearance between the seat component inner diameter and the shaft. Thereby, the ring component can form a mechanical lock operable to inhibit axial movement of the seat component relative to the ring component when the ring component couples the seat component to the shaft.

In another form, the present disclosure provides a seal assembly for an appliance. The seal assembly can include a shaft adapted for use in the appliance and having an outer diameter. The seal assembly can also include a seal head assembly operable to have a sealed engagement with a housing of the appliance. The seal assembly can further include a seal seat assembly operable to have a sealed engagement with the shaft and the seal head assembly to prevent fluid communication between first and second sides of the housing of the appliance. The seal seat assembly can include an annular seat component and a ring component. The seat component can have an inner surface defining an inner diameter. The seat component can be configured to be disposed around the shaft with a first clearance between the seat component inner diameter and the shaft outer diameter. The ring component can include an annular first portion operable to have a sealed engagement with the shaft and a tubular second portion extending axially away from a first end surface of the first portion. The second portion can include a flange extending radially outwardly therefrom. The flange can have an outer diameter and a radial thickness. The ring component can be configured to receive the seat component between the flange and the first portion and couple the seat component to the shaft. The flange outer diameter can be larger than the seat component inner diameter, and the flange radial thickness can be larger than the first clearance. Thereby, the ring component can form a mechanical lock operable to inhibit axial movement of the seat component relative to the ring component when the ring component couples the seat component to the shaft.

In another form, the present disclosure provides an appliance. The appliance can include a housing disposed between a liquid chamber and a motor chamber. The appliance can also have a shaft extending through the housing and between the liquid chamber and the motor chamber. The shaft can have an outer diameter and can be adapted to be coupled to a motor of the appliance. The appliance can further include a seal head assembly having a sealed engagement with the housing. Additionally, the appliance can include a seal seat assembly having a sealed engagement with the shaft. The seal seat assembly can be operable to have a sealed engagement with the seal head assembly to prevent fluid communication between first and second sides of the housing. The seal seat assembly can include an annular seat component and a ring component. The seat component can have an inner surface defining an inner diameter. The seat component can be configured to be disposed around the shaft with a first clearance between the seat component inner diameter and the shaft outer diameter. The ring component can include an annular first portion operable to have a sealed engagement with the shaft and a tubular second portion extending axially away from a first end surface of the first portion. The second portion can include a flange extending radially outwardly therefrom. The flange can have an outer diameter and a radial thickness. The ring component can be configured to receive the seat component between the flange and the first portion and couple the seat component to the shaft. The flange outer diameter can be larger than the seat component inner diameter, and the flange radial thickness can be larger than the first clearance. Thereby, the ring component can form a mechanical lock operable to inhibit axial movement of the seat component relative to the ring component when the ring component couples the seat component to the shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
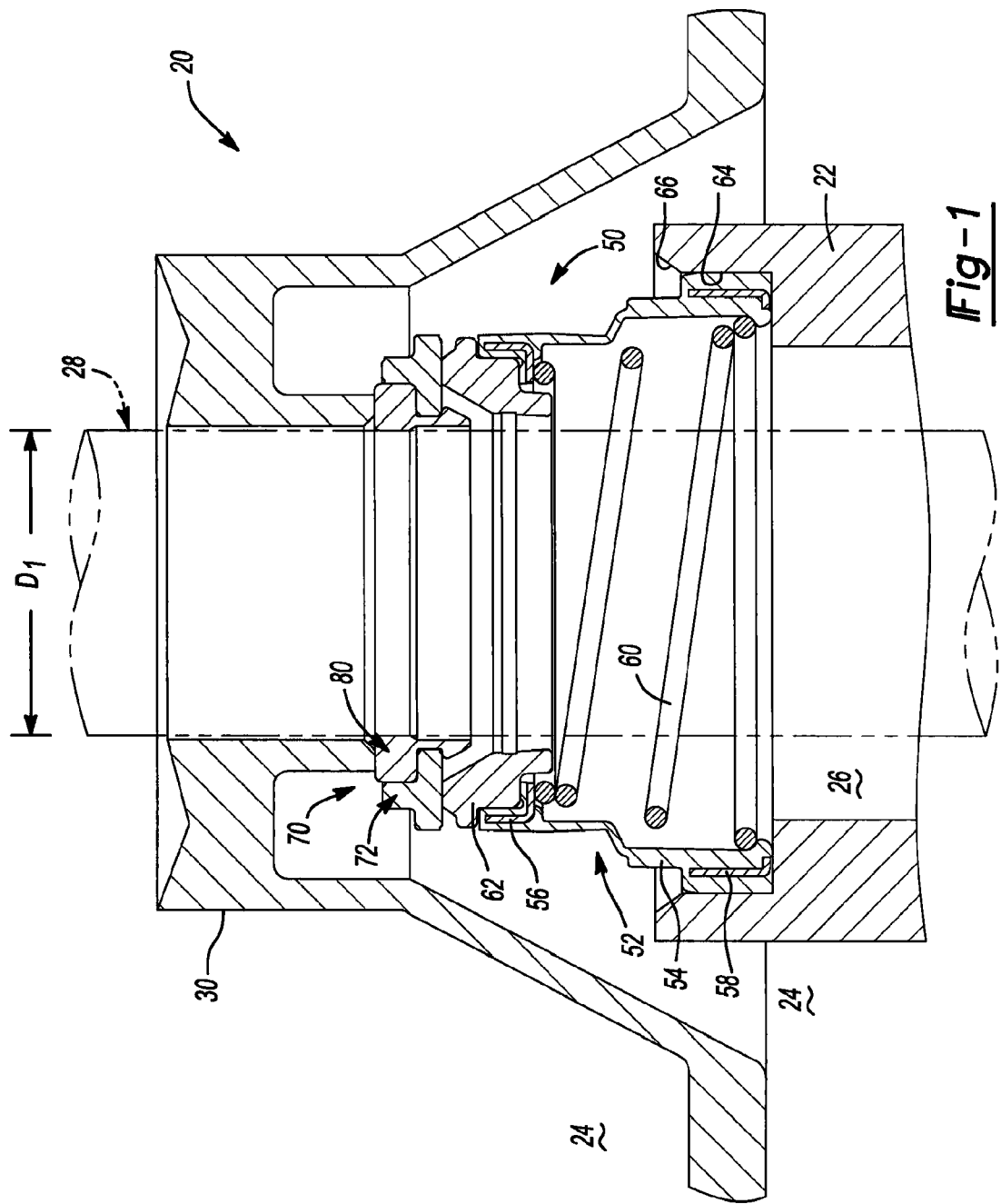
FIG. 1 is a cross-sectional view of a portion of an appliance including a seal assembly with a ring component according to the principles of the present disclosure.
Figure 2A:
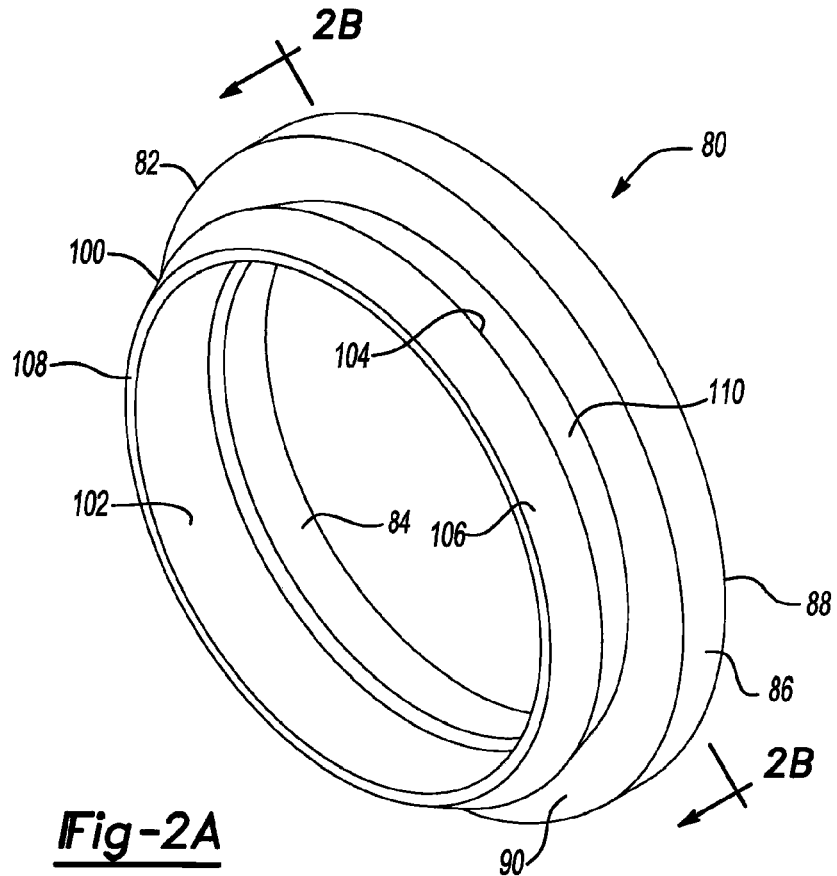
FIG. 2A is a perspective view of the ring component of FIG. 1.
Figure 2B:
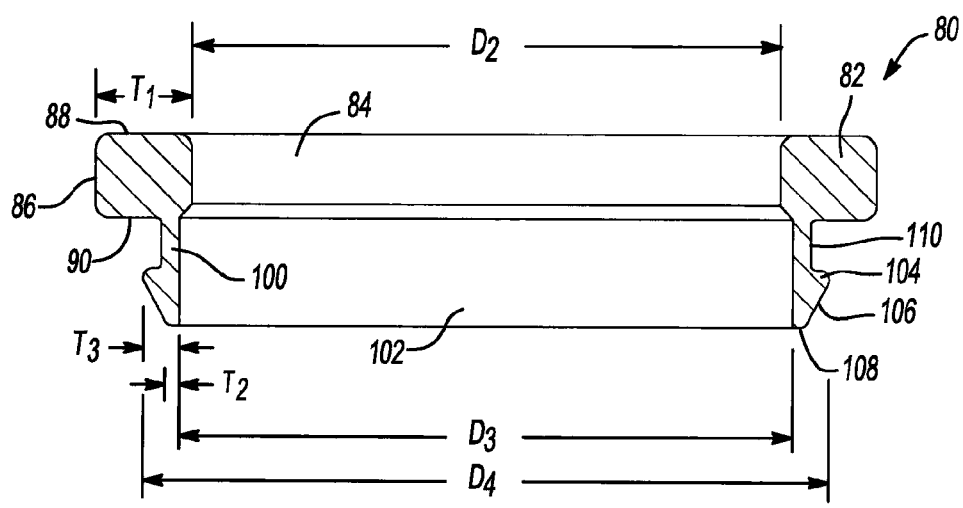
FIG. 2B is a cross-sectional view taken along line 2B-2B of the ring component of FIG. 2A.
Figure 3:
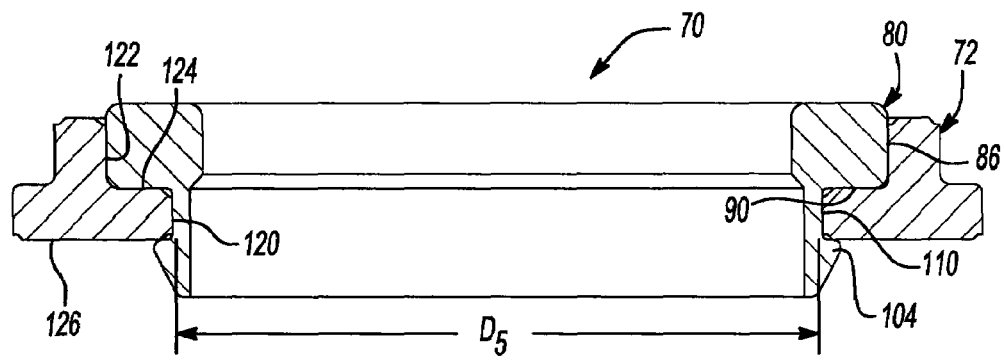
FIG. 3 is a cross-sectional view of a seal seat assembly according to the principles of the present disclosure including the ring component of FIG. 2A engaged with a seat component.

The following description is merely exemplary in nature and is not intended to limit the present disclosure, application, or uses. It should be understood that throughout the drawings, corresponding reference numerals indicate like or corresponding parts and features. For example, like elements may be referred to by the reference indicia 15 and 15'. Additionally, as used herein, the terms "axial" and "axially" refer to a direction substantially parallel to an axis of rotation of a shaft according to the principles of the present disclosure. Furthermore, as used herein, the terms "radial" and "radially" refer to directions substantially perpendicular to an axis of rotation of a shaft according to the principles of the present disclosure.

According to the present disclosure, a seal assembly can include a ring component for coupling a seat component to a shaft. The ring component can include a first portion having an annular shape and configured to have a sealed engagement with the shaft. The ring component can also include a second portion having a flange extending radially outwardly therefrom. The ring component can be configured to receive the seat component between the flange and the first portion and thus form a seal seat assembly. The flange can be configured to mechanically lock the seat component relative to the ring component when the seal seat assembly is disposed on the shaft.

Referring to FIG. 1, a portion of an exemplary appliance 20 is shown. According to the present disclosure, appliance 20 can take the form of a variety of appliances and apparatuses, including but not limited to laundry machines and dishwashers. Appliance 20 can include a housing 22 provided between a liquid or water chamber 24 and a motor chamber 26. Appliance 20 can also include a shaft 28 extending between water chamber 24 and motor chamber 26. Shaft 28 can have a diameter $D_1$. Furthermore, a trunion 30 can be disposed within water chamber 24 and around shaft 28.

Appliance 20 can include a motor (not shown) disposed within motor chamber 26 and operably coupled to shaft 28. The motor can operate shaft 28 according to the function of appliance 20. For example, when appliance 20 is in the form of a laundry machine, the motor can operate shaft 28 through rotation and agitation cycles to provide for such functions as spinning and washing.

Appliance 20 can further include a seal assembly 50. Seal assembly 50 can operate to prevent fluid communication between water chamber 24 and motor chamber 26. For example, when appliance 20 is in the form of a laundry machine, water chamber 24 can be filled with water, and seal assembly 50 can prevent water from entering motor chamber 26. Such sealing can provide for proper operation of appliance 20 and can prevent failure of appliance 20.

Seal assembly 50 can include a seal head assembly 52 fixed to housing 22. Seal head assembly 52 can include a variety of components including a boot 54 and inserts 56 and 58. Boot 54 can have a sealed engagement with housing 22. Inserts 56 and 58 can be disposed within boot 54 to provide structure and support to boot 54. Furthermore, seal head assembly 52 can include a spring 60 and a seal washer 62. Spring 60 can be disposed within boot 54 and can engage with boot 54 to bias boot 54 in the axial direction. Seal washer 62 can be disposed on boot 54. As shown in FIG. 1, shaft 28 can extend through all of the components of seal head assembly 52.

Housing 22 can include a bore 64, and seal head assembly 52 can be press fit within bore 64. Furthermore, bore 64 can include a sloped portion 66 to facilitate such engagement between seal head assembly 52 and bore 64.

The components of seal head assembly 52 can be made from a variety of materials. Boot 54 can be made of an elastomeric material such as nitrile. Inserts 56 and 58 can be made of relatively rigid, corrosion resistive materials such as stainless steel and aluminum. Spring 60 can be conventionally constructed. Seal washer 62 can be made of a thermoset resin such as a phenolic resin including graphite.

To complement and engage with seal head assembly 52, seal assembly 50 can also include a seal seat assembly 70 fixed to shaft 28. Seal seat assembly 70 can have a sealed engagement with shaft 28 and is in a sealed engagement with seal head assembly 52 which is biased against seal seat assembly 70. Thereby, seal assembly 50 can prevent fluid communication between water chamber 24 and motor chamber 26 of appliance 20.

Seal seat assembly 70 can include a variety of components such as a seal seat or seat component 72 and a drive ring or ring component 80. Seal seat 72 and ring component 80 can engage to form seal seat assembly 70, and ring component 80 can couple seal seat 72 to shaft 28. Seal seat 72 can have an annular shape. Seal seat 72 can be configured to have a clearance $C_1$ (FIG. 4) around shaft 28. Seal seat 72 can be made of a relatively rigid material such as a sintered powdered metal, bronze, or stainless steel.

With further reference to FIGS. 2A-4, ring component 80 can have a generally annular shape and can include an annular first portion 82. First portion 82 can include an first inner surface 84 having a diameter $D_2$. First portion 82 and first inner surface 84 can be sized to provide a sealed engagement with shaft 28. For example, diameter $D_2$ of first inner surface 84 can be smaller than diameter $D_1$ of shaft 28, thereby providing a press fit between first portion 82 and shaft 28. Additionally, first portion 82 can define an outside surface 86, a top surface 88 and a bottom surface 90, as well as a radial thickness $T_1$ between first inner surface 84 and outside surface 86.

Ring component 80 can include a second portion 100 axially extending from bottom surface 90 of first portion 82. Second portion 100 can have a tubular shape and can define a radial thickness $T_2$ smaller than radial thickness $T_1$ of first portion 82. Second portion 100 can extend from bottom surface 90 of first portion 82 and can include a second inner surface 102 having a diameter $D_3$. Diameter $D_3$ can be larger than both diameter $D_2$ of first inner surface 84 of first portion 82 and diameter $D_1$ of shaft 28. Second portion 100 can also include a flange 104 extending radially outwardly therefrom. Flange 104 can define a diameter D4 and a radial thickness $T_3$. Additionally, second portion 100 can include a sloped surface 106 extending between flange 104 and an end 108 and a recess 110 between flange 104 and bottom surface 90 of first portion 82.

Ring component 80 can be a single, unitary body including first portion 82 and second portion 100 integrally formed therein. Ring component 80 can be made of an elastomeric material. Suitable materials include, but are not limited to, natural rubber, NBR, and chloroprene.

Ring component 80 can engage with seal seat 72 to form seal seat assembly 70. For example, second portion 100 of ring component 80 can extend through seal seat 72, and ring component 80 can receive seal seat 72 between flange 104 and first portion 82. A first inner surface 120 of seal seat 72 can have a diameter $D_5$ smaller than diameter $D_4$ of the flange 104. As such, ring component 80 can be configured to deform in order to engage seal seat 72. In particular, as ring component 80 and seal seat 72 move axially toward one another, sloped surface 106 can engage first inner surface 120, and second portion 100 can gradually deform radially inwardly. The elastomeric material of ring component 80 can have resilient characteristics allowing for such deformation. Seal seat 72 can be received between flange 104 and first portion 82 to form seal seat assembly 70, and second portion 100 can return to its original shape.

With seal seat 72 received between flange 104 and first portion 82, first inner surface 120 of seal seat 72 can contact recess 110 of ring component 80, a second inner surface 122 of seal seat 72 can contact outside surface 86 of ring component 80, an intermediate surface 124 of seal seat 72 can contact bottom surface 90 of ring component 80, and a bottom surface 126 of seal seat 72 can contact flange 104 of ring component 80. Such a configuration can provide for a sealed engagement between seal seat 72 and ring component 80.

Figure 4:
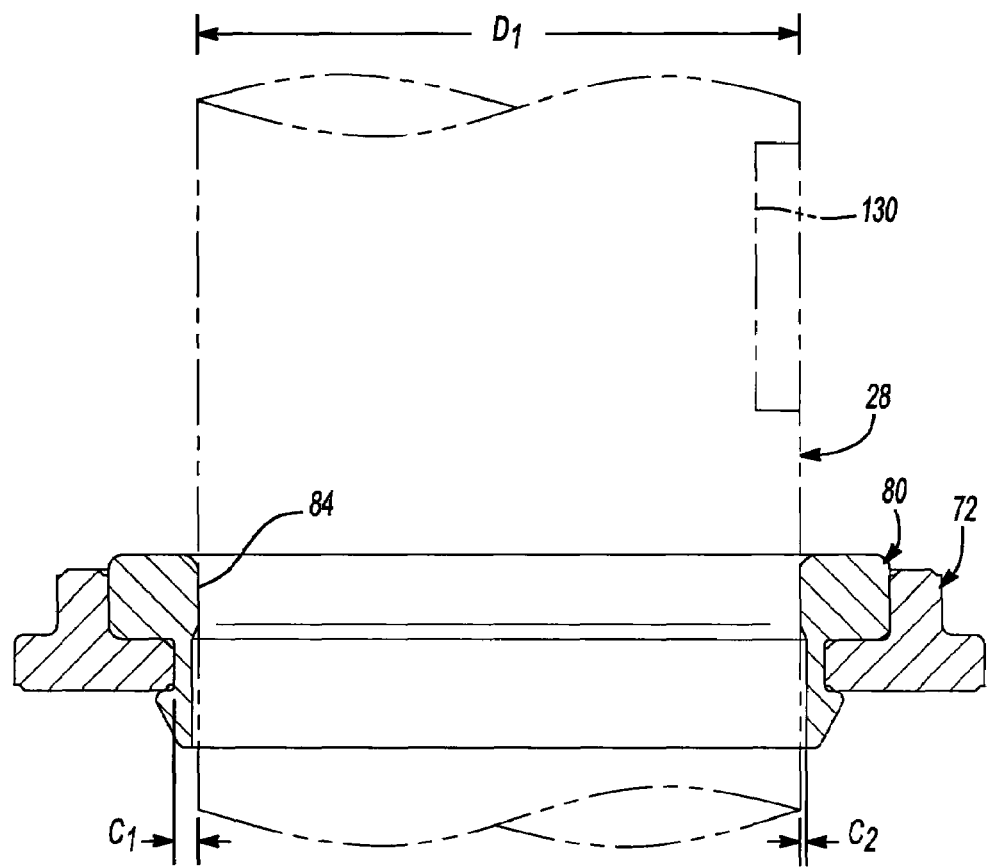
FIG. 4 is a cross-sectional view of the assembly of FIG. 3 engaged with a shaft according to the principles of the present disclosure.

Referring to FIG. 4, seal seat assembly 70 can be disposed on shaft 28. As noted above, first portion 82 (FIGS. 2A, 2B) of ring component 80 can be configured to have a sealed engagement with shaft 28. Furthermore, as also noted above, first inner surface 120 (FIG. 3) of seal seat 72 and second inner surface 102 (FIGS. 2A, 2B) of second portion 100 can be larger than diameter $D_1$ of shaft 28. Thereby, clearance $C_1$ can be provided between seal seat 72 and shaft 28, and a clearance $C_2$ can be provided between second portion 100 and shaft 28.

When seal seat assembly 70 is disposed on shaft 28, ring component 80 can lock seal seat component 72 in an axial position relative to ring component 80. As noted above, diameter $D_5$ of first inner surface 120 of seal seat 72 can be smaller than diameter $D_4$ of the flange 104. Furthermore, thickness $T_3$ of flange 104 can be greater than clearance $C_1$ between seal seat 72 and shaft 28. Thereby, flange 104 can secure seal seat 72 in recess 110 between flange 104 and first portion 82, and ring component 80 can mechanically lock or otherwise inhibit axial movement of seal seat 72 relative to ring component 80 when ring component 80 couples seal seat 72 to shaft 28.

During assembly, seal seat assembly 70 can travel over a length of shaft 28. Clearance $C_2$ can be provided between second portion 100 and shaft 28 and can reduce friction between ring component 80 and shaft 28 during assembly. Furthermore, second portion 100 can help align ring component 80 during assembly. For example, shaft 28 can include features such as a flat 130. If seal seat assembly 70 shifts to a position that is not square with shaft 28 when traveling over flat 130 or any other part of shaft 28, second portion 100 can contact shaft 28 and can limit such a shift.

Figure 5:
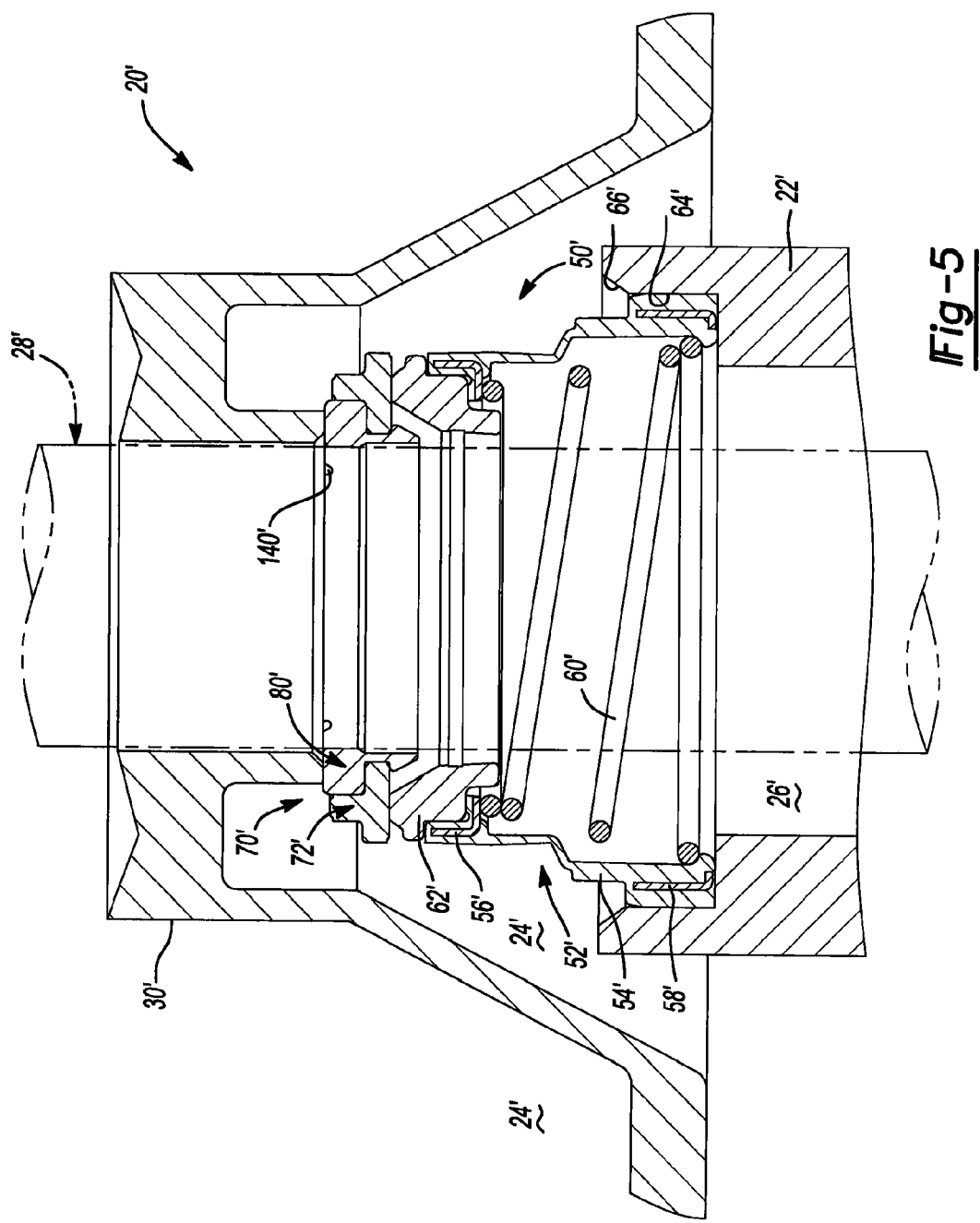
FIG. 5 is a cross-sectional view of an appliance including a seal assembly employing another ring component according to the principles of the present disclosure.

Referring to FIG. 5, an alternate appliance 20' is shown. Appliance 20' can employ an alternate ring component 80' according to the principles of the present disclosure. Appliance 20' can include similar components as appliance 20 discussed above, and it will be understood that the description of appliance 20 and the components thereof can also apply to appliance 20' and the similar components thereof. As such, appliance 20' will not be described in further detail herein.

Figure 6A:
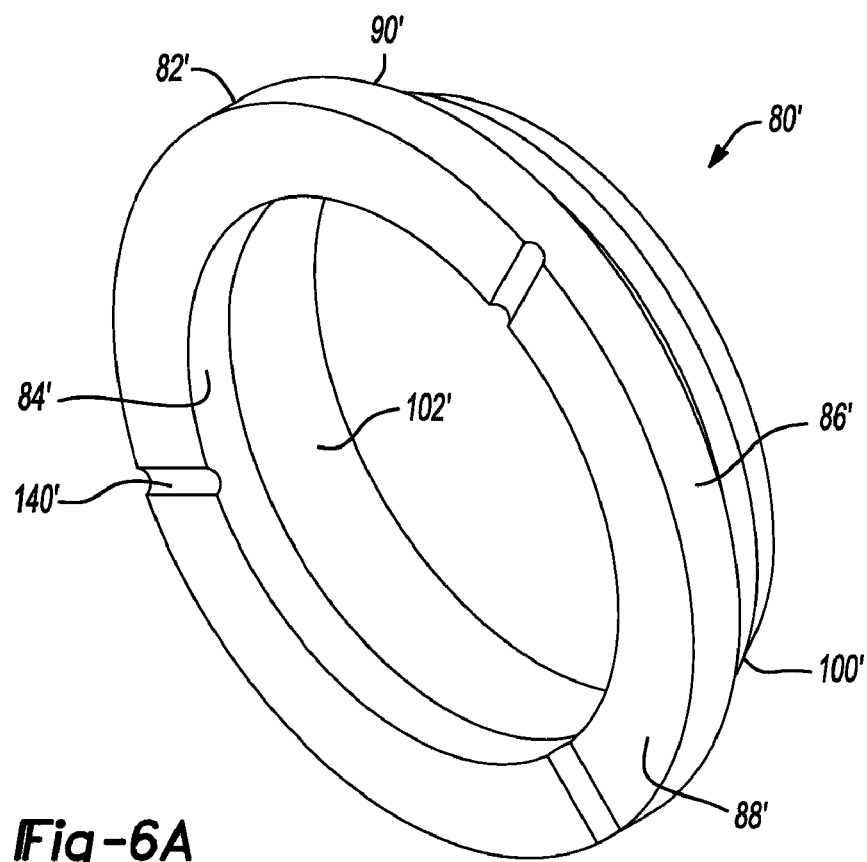
FIG. 6A is a perspective view of the ring component of FIG. 5.
Figure 6B:
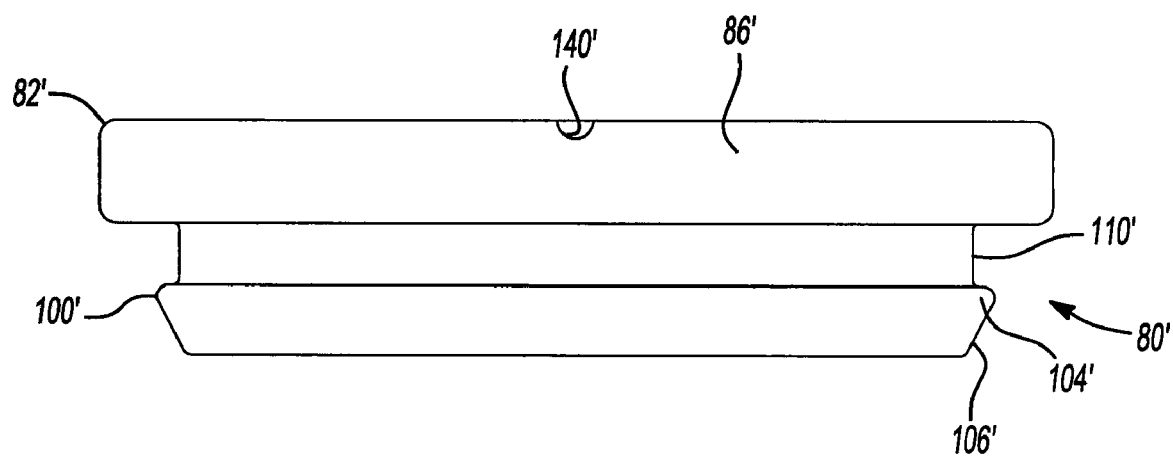
FIG. 6B is a side view of the ring component of FIG. 6A.

With further reference to FIGS. 6A and 6B, ring component 80' can include similar features to ring component 80 discussed below. Accordingly, it will be understood that the description of ring component 80 and the features thereof can also apply to ring component 80' and the similar features thereof. As such, the features of ring component 80' similar to ring component 80 will not be described in further detail herein.

Ring component 80' can include grooves or channels 140' defined on a top surface 88'. Channels 140' can extend radially outwardly across top surface 88'. As shown in FIG. 6A, ring component 80' can include three channels 140' evenly spaced around top surface 88'.

Ring component 80' can include channels 140' to provide for fluid communication between ring component 80' and a trunion 30' (FIG. 5) or another component engaged with top surface 88'. Accordingly, channels 140' can provide for venting between ring component 80' and trunion 30'. For example, when appliance 20' is in the form of a laundry machine, a water chamber 24' can fill with water and trap air between trunion 30' and a housing 22'. If not vented, such trapped air can prevent water from being disposed around a seal assembly 50' to help lubricate seal assembly 50'. However, channels 140' can allow such air to vent between ring component 80' and trunion 30' and further between trunion 30' and a shaft 28'. With the air vented, water can fill in underneath trunion 30' around seal assembly 50' and can help lubricate seal assembly 50'.

The present disclosure can vary in many ways. As noted above, an appliance or apparatus according to the principles of the present disclosure can have a variety of configurations and components. Furthermore, a seal assembly can also have a variety of configurations and components including a variety of seal head assemblies and seal seat assemblies. In particular, according to the principles of the present disclosure, a ring component of a seal assembly can have a variety of configurations and can include a variety of features. Moreover, it will be understood that, according to the principles of the present invention, a seal assembly and the components thereof can be made of a variety of materials not limited to those disclosed herein.

What is claimed is:

1. A seal seat assembly for a shaft of an appliance, the seal seat assembly comprising:
   an annular seat component including a first inner surface defining an inner diameter, said seat component configured to be disposed around the shaft of the appliance with a first clearance between said seat component inner diameter and the shaft; and
   a ring component including an annular first portion operable to have a sealed engagement with the shaft and a second portion extending axially from a first end surface of said first portion, said second portion including a flange extending radially outwardly therefrom, said flange having an outer diameter and a radial thickness, said ring component configured to receive said seat component between said flange and said first portion and couple said seat component to the shaft, said seat component having a second inner surface spaced radially outward from said first inner surface and arranged to engage a radially outermost surface of said first portion of said ring component;
   wherein said flange outer diameter is larger than said seat component inner diameter and said flange radial thickness is configured to be larger than said first clearance between said seat component inner diameter and the shaft, said ring component thereby forming a mechanical lock operable to inhibit axial movement of said seat component relative to said ring component when said ring component couples said seat component to the shaft.

2. The seal seat assembly of claim 1, wherein said second portion of said ring component has a tubular shape.

3. The seal seat assembly of claim 2, wherein said second portion of said ring component has an inner surface defining an inner diameter, said second portion configured to be disposed around the shaft with a second clearance between said second portion inner diameter and the shaft.

4. The seal seat assembly of claim 1, wherein said first portion of said ring component includes a second end surface opposite said first end surface and a venting feature in said second end surface, said venting feature being configured to provide fluid communication between said ring component and a component of the appliance engaging said second end surface.

5. The seal assembly of claim 4, wherein said venting feature includes at least one channel defined in said second end surface, said at least one channel extending radially across said second end surface.

6. The seal seat assembly of claim 5, wherein said venting feature includes three channels equally spaced around said second end surface.

7. The seal seat assembly of claim 1, wherein said second portion of said ring component further includes a sloped surface extending radially inwardly from said flange to an end of said second portion opposite said first portion, said sloped surface being configured to facilitate engagement of said seat component and said ring component.

8. The seal seat assembly of claim 1, wherein said first portion of said ring component is configured to have a press fit with the shaft.

9. The seal seat assembly of claim 1, wherein said ring component includes an elastomeric material.

10. A seal assembly for an appliance comprising:
a shaft adapted for use in the appliance and having an outer diameter,
a seal head assembly operable to have a sealed engagement with a housing of the appliance; and
a seal seat assembly operable to have a sealed engagement with said shaft and said seal head assembly to prevent fluid communication between first and second sides of the housing of the appliance, said seal seat assembly including:
an annular seat component including a first inner surface defining an inner diameter, said seat component configured to be disposed around said shaft with a first clearance between said seat component inner diameter and said shaft outer diameter, and
a ring component including an annular first portion operable to have a sealed engagement with said shaft and a tubular second portion extending axially away from a first end surface of said first portion, said second portion including a flange extending radially outwardly therefrom, said flange having an outer diameter and a radial thickness, said ring component configured to receive said seat component between said flange and said first portion and couple said seat component to said shaft, said seat component having a second inner surface spaced radially outward from said first inner surface and arranged to engage a radially outermost surface of said first portion of said ring component;
wherein said flange outer diameter is larger than said seat component inner diameter and said flange radial thickness is larger than said first clearance, said ring component thereby forming a mechanical lock operable to inhibit axial movement of said seat component relative to said ring component when said ring component couples said seat component to said shaft.

11. The seal assembly of claim 10, wherein said first portion of said ring component includes a second end surface opposite said second portion and a venting feature in said second end surface, said venting feature being configured to provide fluid communication between said ring component and a component of the appliance engaging said second end surface.

12. The seal assembly of claim 11, wherein said venting feature includes at least one channel defined in said second end surface, said at least one channel extending radially across said second end surface.

13. The seal assembly of claim 12, wherein said venting feature includes three channels equally spaced around said second end surface.

14. An appliance comprising:
a housing disposed between a liquid chamber and a motor chamber;
a shaft extending through said housing and between said liquid chamber and said motor chamber, said shaft having an outer diameter and being adapted to be coupled to a motor of the appliance;
a seal head assembly having a sealed engagement with said housing; and
a seal seat assembly having a sealed engagement with said shaft, said seal seat assembly operable to have a sealed engagement with said seal head assembly to prevent fluid communication between first and second sides of said housing, said seal seat assembly including:
an annular seat component including a first inner surface defining an inner diameter, said seat component configured to be disposed around said shaft with a first clearance between said seat component inner diameter and said shaft outer diameter, and
a ring component including an annular first portion operable to have a sealed engagement with said shaft and a tubular second portion extending axially away from a first end surface of said first portion, said second portion including a flange extending radially outwardly therefrom, said flange having an outer diameter and a radial thickness, said ring component configured to receive said seat component between said flange and said first portion and couple said seat component to said shaft, said seat component having a second inner surface spaced radially outward from said first inner surface and arranged to engage a radially outermost surface of said first portion of said ring component;
wherein said flange outer diameter is larger than said seat component inner diameter and said flange radial thickness is larger than said first clearance, said ring component thereby forming a mechanical lock operable to inhibit axial movement of said seat component relative to said ring component when said ring component couples said seat component to said shaft.

15. The appliance of claim 14, wherein said first portion of said ring component includes a second end surface opposite said first end surface and a venting feature in said second end surface, said venting feature providing fluid communication between said ring component and a component of the appliance engaging said second end surface.

16. The appliance of claim 15, further comprising a trunion disposed within said liquid chamber around said shaft and engaging said second end surface of said ring component, said venting feature being configured to provide fluid communication between said ring component and said trunion.

17. The appliance of claim 14, wherein said appliance is a laundry machine.

18. The seal seat assembly of claim 1, wherein said ring component comprises a unitary ring component.

19. The seal seat assembly of claim 1, wherein said seat component includes a radially outermost surface having a diameter larger than said radially outermost surface of said first portion of said ring component.

20. The seal assembly of claim 10, further comprising a seal washer disposed around said shaft, wherein a bottom surface of said seat component is arranged to engage said seal washer and said flange.

* * * * *